United States Patent [19]
Kawakami

[11] Patent Number: 5,930,535
[45] Date of Patent: Jul. 27, 1999

[54] EXPOSURE CONTROL DEVICE FOR CAMERA

[75] Inventor: Sohichiroh Kawakami, Tokyo, Japan

[73] Assignee: Asahi Kogaku Kogyo Kabushiki Kaisha, Tokyo, Japan

[21] Appl. No.: 08/982,356

[22] Filed: Dec. 2, 1997

[30] Foreign Application Priority Data

Dec. 3, 1996 [JP] Japan ................................. 8-322457

[51] Int. Cl.⁶ .............................. G03B 7/085; H01F 7/18
[52] U.S. Cl. .......................... 396/258; 361/159; 335/229
[58] Field of Search ................................. 396/508, 258, 396/468, 467; 335/229; 361/159

[56] References Cited

U.S. PATENT DOCUMENTS

| | | | |
|---|---|---|---|
| 3,790,264 | 2/1974 | Heinrich | 352/174 |
| 3,797,028 | 3/1974 | Miyakawa et al. | 396/246 |
| 3,922,693 | 11/1975 | Matsui | 396/258 |
| 4,396,272 | 8/1983 | Shono et al. | 396/235 |
| 4,458,289 | 7/1984 | Lukasczyk | 361/139 |
| 4,514,075 | 4/1985 | Negishi et al. | 396/235 |
| 4,769,553 | 9/1988 | Tomita | 290/38 E |
| 5,347,186 | 9/1994 | Konotchick | 310/17 |

Primary Examiner—W. B. Perkey
Attorney, Agent, or Firm—Greenblum & Bernstein P.L.C.

[57] ABSTRACT

Disclosed is an exposure control device for a camera. The exposure control device has a magnetic plunger including a permanent magnet and a plunger coil. The plunger coil generates, when energized, a magnetic field which weakens a magnetic force of the permanent magnet. A resistor is connected in parallel with the plunger coil. Resistance of the resistor is substantially equal to a DC resistance of the plunger coil.

10 Claims, 6 Drawing Sheets

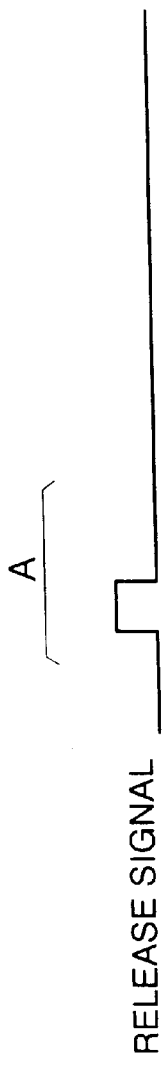
FIG. 4A   RELEASE SIGNAL
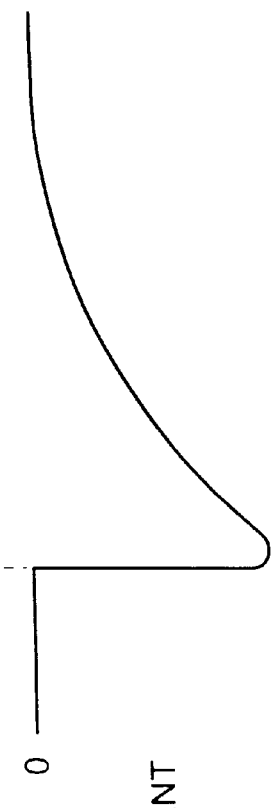
FIG. 4B   PHOTO INTERRUPTER OUTPUT
FIG. 4C   PLUNGER COIL CURRENT
FIG. 4D   MECHANICAL SHOCK

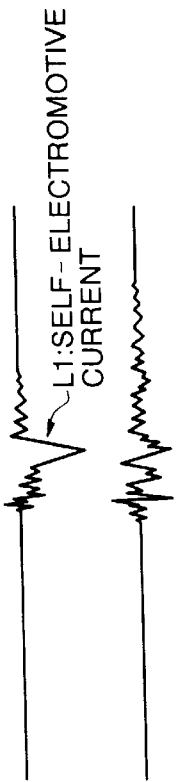
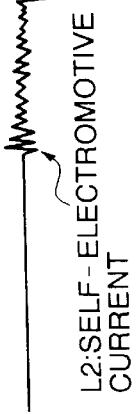
FIG. 5A  RELEASE SIGNAL
FIG. 5B  PHOTO INTERRUPTER OUTPUT
FIG. 5C  PLUNGER COIL CURRENT
PRIOR ART
FIG. 5D  MECHANICAL SHOCK
FIG. 6A  RELEASE SIGNAL
FIG. 6B  PHOTO INTERRUPTER OUTPUT
FIG. 6C  PLUNGER COIL CURRENT
FIG. 6D  SHOCK
L1: SELF-ELECTROMOTIVE CURRENT
L2: SELF-ELECTROMOTIVE CURRENT

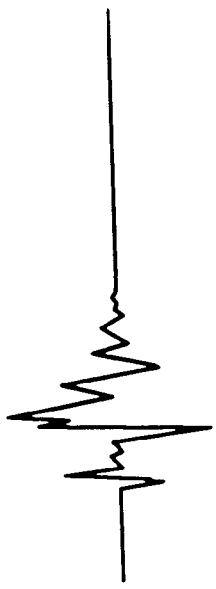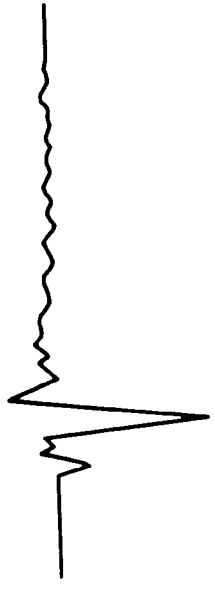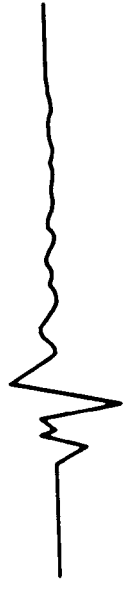
FIG. 7A  MECHANICAL SHOCK
FIG. 7B  RX 9Ω
FIG. 7C  100Ω
FIG. 7D  15Ω

EXPOSURE CONTROL DEVICE FOR CAMERA

BACKGROUND OF THE INVENTION

The present invention relates to an exposure control device for a camera, and more particularly to an exposure control device which employs a magnetic plunger for a driving mechanism of diaphragm members and/or shutter blades.

Conventionally, in a exposure control device for a camera, the magnetic plunger has been used as a part of a driving mechanism for shutter blades and/or diaphragm members. When the magnetic plunger is used as a part of a driving mechanism of the diaphragm member, for example, the magnetic plunger is used for stopping movement of diaphragm members.

An example of such a mechanism includes a lever which prevents or stops movement of diaphragm members. The lever is urged in a certain direction. Further, the lever is provided with a ferromagnetic member which is neutrally attracted by a permanent magnet-of the magnetic plunger. When the exposure control is carried out, the diaphragm members are driven to a predetermined position to define a predetermined aperture. When the diaphragm members have reached the predetermined position, electrical current is supplied to a coil of the magnetic plunger to temporarily demagnetized the magnet force of the magnetic plunger. When the magnetic force of the magnetic plunger is temporarily weakened, the ferromagnetic member of the lever caught by the magnetic plunger is released therefrom, and the lever moves in the urged direction to stop movement of the diaphragm members. After the diaphragm members are moved to the predetermined position to define the predetermined aperture, shutter blades are moved to start exposure. Thus, an appropriate (or desired) exposure condition can be obtained.

In an exposure control device using such a magnet plunger, electrical current is sometimes generated inside the coil of the magnetic plunger due to electrical noise before the electrical current is supplied thereto. Generation of the unintentional electrical current inside the coil may be caused by a self-electromotive effect due to relative oscillation between the coil and the permanent magnet, and/or electrical noises generated by surrounding devices.

The relative movement between the coil and the permanent magnet may occur due to a mechanical impact when mechanical parts of the camera start and/or stop moving. The self-electromotive current generates a magnetic field for the plunger coil. The magnetic field acts to reduce the magnetic force of the permanent magnet in the magnet plunger. As a result, in the above-described example, the lever is incidentally released from the magnetic plunger before the diaphragm members reach the predetermined position. In such a case, an appropriate exposure control cannot be performed.

SUMMARY OF THE INVENTION

It is therefore an object of the present invention to provide an exposure control device in which an erroneous operation of a magnet plunger caused by the electrical current generated therein is prevented.

To accomplish this object, according to an aspect of the invention, there is provided an exposure control device for a camera comprising a magnetic plunger having a permanent magnet and a plunger coil and a resistor connected in parallel with the plunger coil. The resistance of the resistor is substantially equal to resistance of the plunger coil.

Since the resistor is connected with the plunger coil in parallel, even if an electrical current is generated inside the plunger coil due to noise or self-electromotive power, it is sufficiently suppressed so that the magnetic field generated due to the current inside the plunger coil does not affect the operation of the magnetic plunger.

In a preferred embodiment, the resistance of the plunger coil is equal to or less than 100Ω and in such a case, the resistance of the resistor is also equal to or less than 100Ω. For example, the resistance of the plunger coil is approximately 15Ω, and in such a case, it is preferable that the resistance of the resistor is also approximately 15Ω.

Optionally, the exposure control device may include an aperture control system which is driven to control an opening size of an aperture, and a mechanism which stops the aperture control system when the operable ferromagnetic member is attracted by the magnetic plunger. The aperture control system is allowed to vary the opening size of the aperture. When the operable magnetized member is released from the magnetic plunger, the mechanism prevents the aperture control system from changing the opening size.

According to another aspect of the invention, there is provided an exposure control device for a camera, comprising an aperture control system, a detecting system, a locking mechanism, a magnetic player, a resistor and a controller. The aperture control system is driven to vary an opening size of an aperture in relation with a release operation of the camera. The detecting system detects a driven amount of the aperture control system, and outputs a detection signal when the driven amount has reached a predetermined value. The locking mechanism locks the operation of the aperture control system. The magnetic plunger includes a permanent magnet and a plunger coil. The permanent magnet generates a magnetic force to attract the locking mechanism and the plunger coil generates a magnetic field for reducing the magnetic force of the permanent magnet when an electric current is supplied. The locking mechanism is prevented from locking the operation of the aperture control system when the magnetic plunger attracts the locking mechanism.

The resistor is connected in parallel with the plunger coil, with resistance of the resistor being substantially equal to a DC resistance of the plunger coil. The controller supplies electrical current to the plunger coil in response to the detecting system outputting the detection signal.

According to further aspect of the invention, there is provided a magnetic plunger comprising a permanent magnet, a plunger coil, and a resistor, connected in parallel with the plunger coil. The plunger coil generates, when energized, a magnetic field which weakens magnetic force of the permanent magnet. Preferably, the resistance of the plunger coil is substantially equal to a DC resistance of the plunger coil.

BRIEF DESCRIPTION OF THE DRAWINGS

FIGS. 4A–4D are timing charts showing a relationship between an exposure control operation and a mechanical-shock;

FIGS. 5A–D are timing charts of an exposure control operation of the prior art;

FIGS. 6A–6D are timing charts of an exposure control operation of the present invention; and FIGS. 7A–7D show relationships between a mechanical shock and self-electromotive currents when various resistance are connected, in parallel, with the plunger coil.

DETAILED DESCRIPTION OF THE EMBODIMENTS

An exposure control device for a camera embodying the present invention will be described with reference to the accompanying drawings.

Figure 1:
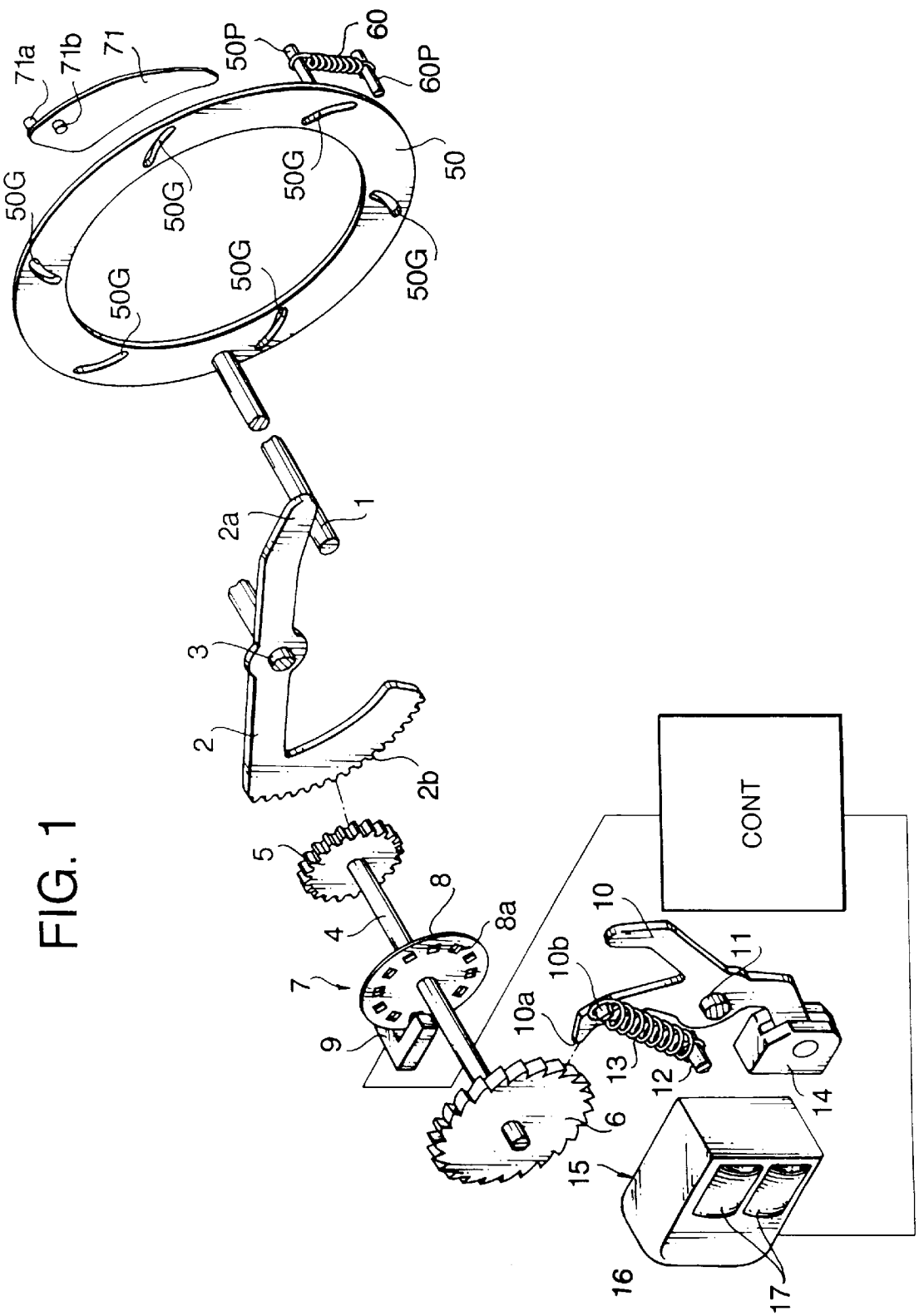
FIG. 1 is a partially exploded perspective view showing a schematic construction of a part of an exposure control device according to the present invention.

FIG. 1 is a perspective view showing a part of an exposure control device according to an embodiment of the present invention.

An aperture control pin 1 shown in FIG. 1 is connected to an aperture driving ring 50 of an aperture mechanism, not shown. On the aperture driving ring 50, a pin 50P is provided to which an end of a biasing spring 60 is secured. The other end of the biasing spring 60 is secured to a fixed pin 60P which is fixedly secured to a camera body (not shown) such that the aperture driving ring 50 is biased to rotate in a clockwise direction in FIG. 1. Accordingly, the pin 1 is biased to move upwardly in FIG. 1. The aperture driving ring 50 is formed with cam grooves 50G. The aperture mechanism is further provided with six aperture blades 71. Note that only one of the blades 71 is shown in FIG. 1 to keep the drawing from being made complicated. On each blade 71, an engaging pin 71b which engages with the cam groove 50G is provided. Further, on each blade 71, another pin 71a which is fitted in a supporting ring (not shown) is provided. When the aperture driving ring 50 rotates in the clockwise direction, relative to the not shown supporting ring, the aperture blades 71 move in a direction so that an aperture opening defined by the aperture blades 71 is made small due to engagement of the pin 71b and the groove 50G. Thus, the pin 1 is biased to move upwardly by the biasing force of the spring 60 toward a position where an aperture opening is fully closed.

An aperture control lever 2 is mounted on a supporting shaft 3 to swing about the shaft 3. One end 2a of the lever 2 is arranged to contact the pin 1 on its upper side as seen in FIG. 1. The other end 2b of the lever 2 is formed as a sector gear to engage with a first gear wheel 5. The lever 2 is driven by a shutter driving mechanism (not shown) when an exposure operation starts to rotate in the counter-clockwise direction. As the lever 2 rotates in the counter-clockwise direction, the aperture control pin 1 moves upwardly by a biasing force of the spring 60, and the aperture size is reduced.

The first gear wheel 5 is mounted on a rotary shaft 4 which rotates in a normal or reverse direction in accordance with the swing movement of the lever 2. Also mounted on the rotary shaft 4, are a rotary disk 8 and a ratchet wheel 6.

Figure 2:
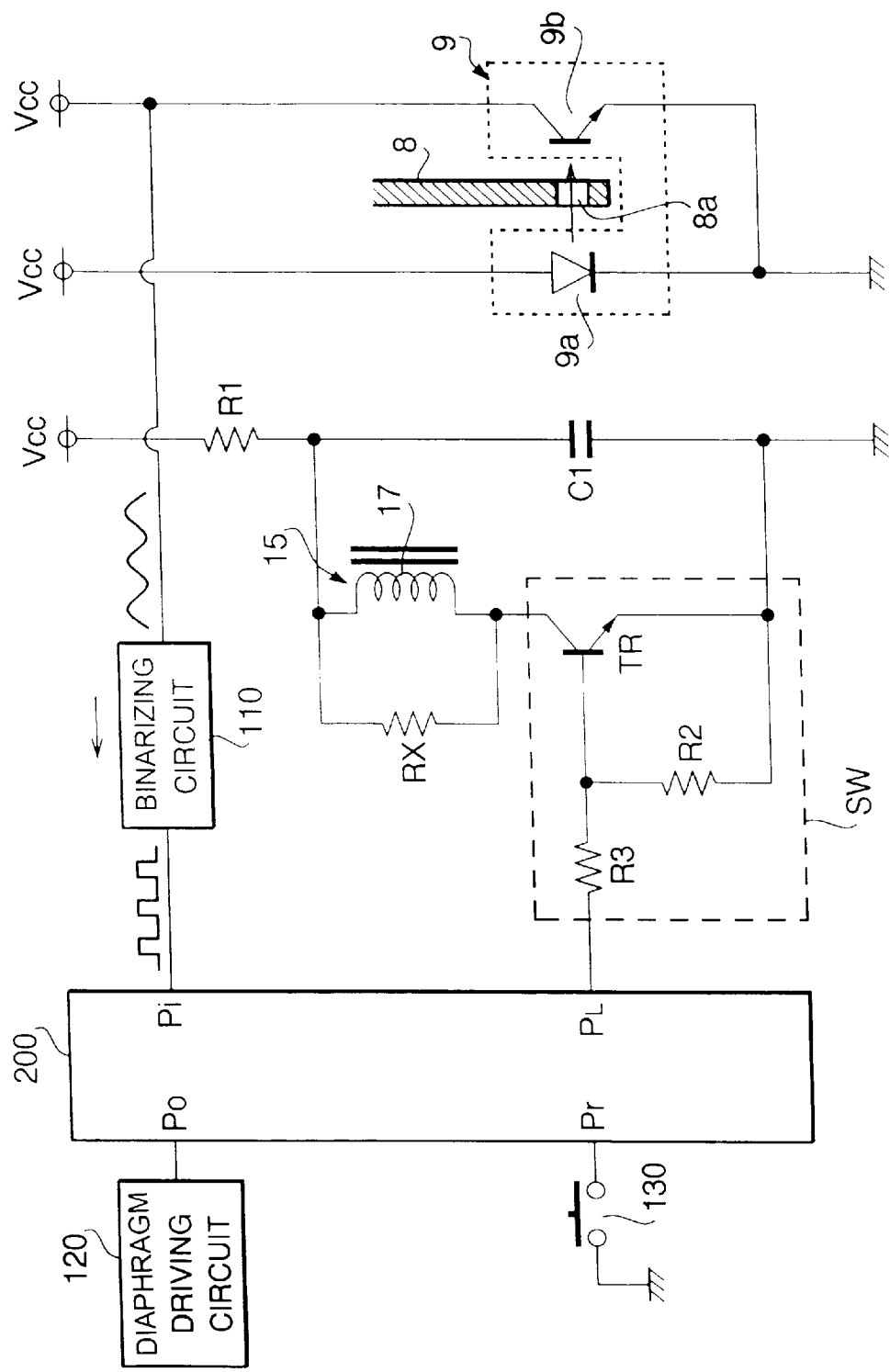
FIG. 2 is a circuit diagram of a control circuit used in the aperture control device shown in FIG. 1.

The rotary disk 8 constitutes a detector 7 for detecting a rotation amount of the lever 2 in combination with a photo-interrupter 9. The rotary disk 8 is provided with a plurality of slits 8a formed on the circumferential periphery of the disc 8 and arranged at predetermined intervals. The photo-interrupter 9 is provided, as shown in FIG. 2, with a light emitting portion 9a and a light receiving portion 9b. Between the light emitting portion 9a and the light receiving portion 9b, a part of the disc 8 is positioned such that, upon rotation of the disk 8, the slits 8a sequentially cross the optical path between the light emitting and receiving portions 9a and 9b.

A ratchet lever 10 mounted on a pivot shaft 11 is disposed such that a pawl end 10a of the lever 10 can engage the ratchet wheel 6. The ratchet lever 10 is biased to rotate about the pivot shaft 11 in the counter-clockwise direction in FIG. 1 by means of a coil spring 13 which bridges a fixed pin 12 and a bent portion 10b of the lever 10. Another end of the lever 10 carries a ferromagnetic member 14 which is to be attracted by a permanent magnet 16.

The permanent magnet 16 constitutes a magnetic plunger 15 in combination with a plunger coil 17 housed in the permanent magnet 16, and is disposed such that when the ferromagnetic member 14 is attracted to the permanent magnet 16, the ratchet lever 10 is rotated in the clockwise direction against the biasing force of the coil spring 13.

FIG. 2 is a circuit diagram of a controller CONT shown in connection with the photo-interrupter 9 and the plunger coil 17.

As shown, one end of the plunger coil 17 is connected to a power source Vcc through a resistor R1, and grounded through a capacitor C1. The other end of the plunger coil 17 is connected to a switch circuit SW consisting of a transistor TR and resistors R2 & R3, and the electric current is supplied to the plunger coil 17 from the power source Vcc when the transistor TR is turned on.

The control circuit CONT includes a microcomputer 200 which has four ports Pi, PL, Po, and Pr. To the port Pi, the pulse signal generated by the photo-interrupter 9 is input via a binarizing circuit 110. The binarizing circuit 110 receives the signal output by the photo-interrupter 9 and outputs a shaped pulse signal having a rectangular waveform. The port PL outputs a ratch signal (H: high signal) for turning ON the transistor TR. The transistor TR is turned OFF when the port PL outputs a L (low) signal. The port Po outputs a diaphragm movement start signal. A diaphragm driving circuit 120 starts rotating the ratchet lever 10 upon receipt of the diaphragm movement start signal. The port Pr is a port to which a release signal indicative of whether a release switch 130 is turned ON or OFF is input.

Between both ends of the plunger coil 17, a resistor RX is connected, i.e., the resistor RX is connected in parallel with the plunger coil 17. The resistance of the resistor RX is substantially equal to a DC resistance of the plunger coil 17.

In the photo-interrupter 9, the light emitting portion 9a includes a light emitting diode and the light receiving portion 9b includes a photo-diode.

Figure 3A:
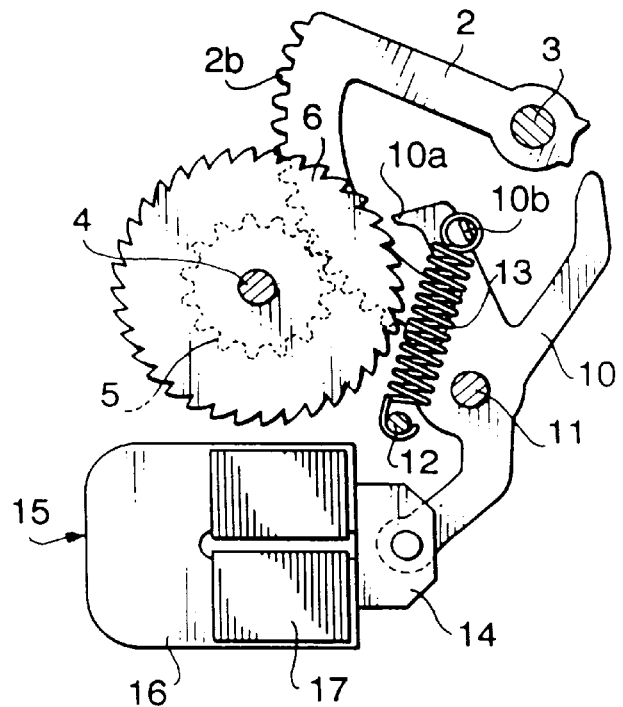
FIGS. 3A and 3B are front views of the principal part explaining the operation of the exposure control device shown in FIG. 1.

With the above construction, at the time when a shutter-release operation is initiated (i.e., the release switch 130 is operated), the electric current is not available in the plunger coil 17 of the magnetic plunger 15, and the ferromagnetic member 14 is attracted by the permanent magnet 16 as illustrated in FIG. 3A. In this state, the ratchet lever 10 has been swung in the clockwise direction against the biasing force of the coil spring 13, and the pawl end 10a of the lever 10 is apart from the ratchet wheel 6. That is, the ratchet wheel 6 and therefore its coaxial first gear wheel 5 are in a freely rotatable condition.

Then, the diaphragm driving circuit 120 drives the lever 2 to swing in the counter-clockwise direction in FIG. 3A, so that the aperture pin 1 (see FIG. 1) is allowed to move upwardly to change the aperture size. Upon swinging movement of the lever 2, the first gear wheel 5 which is engaged with the sector gear portion 2b of the lever 2 is correspondingly rotated. The rotary disk 8 and the ratchet wheel 6 mounted on the shaft 4 coaxially with the first gear. wheel 5 are also rotated synchronously. The rotary angle of the shaft 4 is detected by counting the number of pulses generated by the photo-interrupter 9. When the number of pulses has reached a certain number, i.e., the rotary angle of the shaft 4 reached a certain value, the microcomputer 200 outputs an H (logical-high) signal from the port PL so that the switch circuit SW is turned ON, and the electric current is supplied to the plunger coil 17.

Figure 3B:
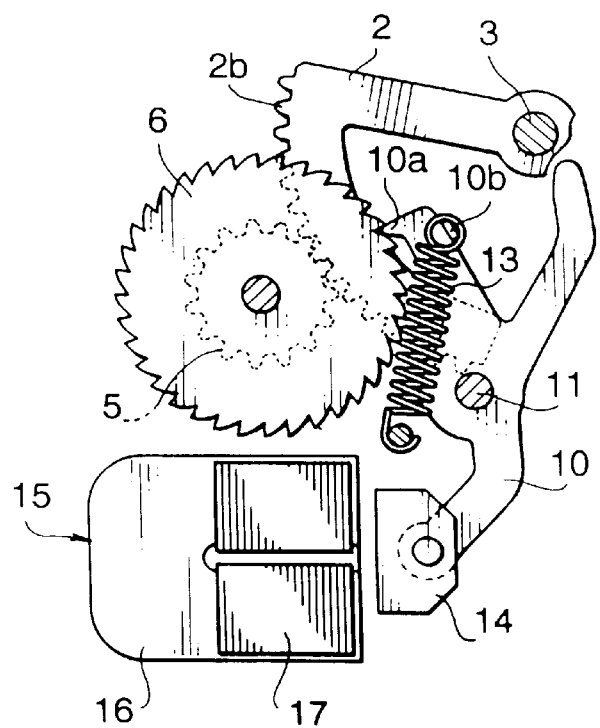

When the electric current is available, a magnetic field is generated by the plunger coil 17 in the direction where the magnetic force of the permanent magnet 16 is reduced. At this stage, the magnetic force of the magnetic plunger 15 is weaker than the biasing force of the coil spring 13, and the magnetic member 14 is released from the magnet 16. Accordingly, the ratchet lever 10 rotates in the counter-clockwise direction by the biasing force of the coil spring 13, and the pawl end 10a of the ratchet lever 10 engages the ratchet wheel 6 to prevent the rotation of the ratchet wheel 6 as illustrated in FIG. 3B. In this state, the rotation of the shaft 4 and therefore the rotation of the first gear wheel 5 is also prevented, and swinging movement of the aperture lever 2 is stopped. Thus, the upward movement of the aperture pin 1 is stopped, and the opening size of the aperture is maintained.

In the above explained construction, a so-called "mechanical shock" may be caused by a shutter-release operation. FIGS. 4A–4D are timing charts for showing relationships among a shutter-release signal (FIG. 4A), output of the photo-interrupter 9 (FIG. 4B), electric current available in the plunger coil 17 (FIG. 4C), and the mechanical shock (FIG. 4D). That is, upon boosting the shutter-release signal, the lever 2 initiates the aperture control operation described above, and the first gear wheel 5 is rotated and the pulse signal is generated by the photo-interrupter 9. When the number of pulses output by the photo-interrupter 9 has reached the predetermined value, the microcomputer 200 outputs the H (logical-high) signal to turn ON the transistor TR so that electric current is supplied to the plunger coil 17 in order to stop the aperture control operation, and output of pulse signal from the photo-interrupter 9 ceases.

FIGS. 5A–5D show enlarged timing charts corresponding to a part indicated as a reference A in the timing charts of FIGS. 4A–4D. FIGS. 5A–5D show charts when the resistor RX is not connected in parallel with the plunger coil 17 (i.e., prior art).

In this case, if a self-electromotive current L1 is generated in the plunger coil 17 due to the mechanical shock caused by a shutter-release operation, a magnetic field is generated by the self--electromotive-current L1, the magnetic force of the magnetic plunger 15 is temporarily weakened, and the magnetic member 14 is released from the magnetic plunger 15. As described above, when the magnetic member 14 is released from the magnetic plunger 15, the pawl end 10a of the ratchet lever 10 engages the ratchet wheel 6, and movement of the aperture lever 2 stops.

FIGS. 6A–6D show enlarged timing charts corresponding to the part indicated as the reference A in the timing charts of FIGS. 4A–4D. FIGS. 6A–6D show the case when the resistor RX is connected in parallel with the plunger coil 17.

In this case, even if the self-electromotive current L2 is generated in the plunger coil 17 due to the mechanical shock caused by the shutter-release operation, the level of the current L2 available in the plunger coil 17 is relatively small, and a duration of time when the self-electromotive current L2 is generated is relatively short, the magnetic field generated by the current L2 is relatively weak, and accordingly, the magnetic force of the magnetic plunger 15 remains sufficiently strong to attract the magnetic member 14. Therefore, in this case, the swing movement of the lever 2 is not prevented before the first gear wheel 5 rotates a predetermined angle.

When the first gear wheel 5 rotates by a predetermined amount, the swing movement of the lever 2 is prevented as described above, and exposure operation is performed with an appropriate aperture size.

FIGS. 7A–7D show the relationship between the mechanical shock and the self-electromotive current available in the plunger coil 17 for various resistance values of the resistor RX. In this embodiment, the DC resistance of the plunger coil 17 is approximately 15Ω. FIGS. 7B–7D show the self-electromotive currents generated by the plunger coil 17 when the resistance of RX is 9Ω, 100Ω, and 15Ω, respectively. It should be noted that in FIGS. 7B–7D, a horizontal axis represents duration of time, and a vertical axis represents the electrical current available in the plunger coil 17.

As shown in FIG. 7B, when the resistance of the RX is 9Ω, the electrical current generated in the plunger coil 17 is relatively small. However, with this resistance, when a normal current for temporarily weakening the magnetic plunger 15 is supplied to the plunger coil 17, sufficient magnetic field cannot be generated, and therefore an accurate exposure control cannot be performed. That is, if the resistance of the resistor RX is relatively small, the electrical current flowing through the resistor RX becomes too great, and the electrical current flowing through the plunger coil 17 becomes too small. In such a case, the magnetic field generated by the plunger coil 17 cannot weaken the attractive force of the magnet 16 sufficiently.

When the resistance of the RX is 100Ω, as shown in FIG. 7C, generation of the self-electromotive electrical current cannot be suppressed sufficiently, and therefore the problem may not be solved. Accordingly, the exposure control cannot be performed accurately. That is, if the resistance of the resistor RX is relatively large, the electrical current flowing through the resistor RX becomes too small. In this case, the self-electromotive current generated in the plunger coil 17 cannot be bypassed sufficiently.

If the resistance of the RX is 15Ω, which is substantially the same as the DC resistance of the plunger coil 17, the self-electromotive current is generated in the plunger coil 17. However, the generated current is not significant, and the magnetic field generated due to the self-electromotive current does not allow the magnetic member 14 to release from the magnetic plunger 15. Therefore, in this case, the unintentional swing movement of the ratchet lever 10 can be prevented, and the diaphragm members can be driven accurately. Further, with this value of the resistor RX, by supplying electrical current which is slightly greater than the current which would normally be supplied, sufficient magnetic field is generated by the plunger coil 17, and the appropriate exposure operation can be guaranteed. Thus, as a result, the resistance of the resistor RX to be connected in parallel with the plunger coil 17 is preferably in a range between a value slightly smaller than the resistance of the plunger coil 17 and value slightly greater than the resistance of the plunger coil 17.

While the DC resistance of the plunger coil is approximately 15Ω in the above embodiment, the resistance of the resistor RX connected in parallel may be determined in accordance with the resistance of the plunger coil. According to an experiment performed by the inventors, it is confirmed that a preferred effect can be obtained for plunger coils having different resistance if the resistance of the resistor RX connected in parallel with the plunger coil is substantially equal to the DC resistance of the plunger coil. It should be noted that the DC resistance of generally used plunger coils is equal to or less than 100Ω, and for any one of such plunger coils, the effect as described above can be obtained if the resistance of the resistor RX is substantially equal to the DC resistance of the plunger coil.

As described above, according to the present invention, in which a plunger coil of a magnet plunger for controlling an exposure and a resistor, having resistance substantially equal to that of the plunger coil, are connected in parallel to each other, it is possible to restrain the generation of a self-electromotive current in the plunger coil and thus to prevent an erroneous operation of the magnet plunger, which in turn allows an appropriate exposure control to be achieved.

The present disclosure relates to subject matter contained in Japanese Patent Application No. HEI 08-322457, filed on Dec. 3, 1996, which is expressly incorporated herein by reference in its entirety.

What is claimed is:

1. An exposure control device for a camera, comprising:
   a locking mechanism, which locks and unlocks an aperture of said exposure control device;
   a magnetic plunger having a permanent magnet and a plunger coil fixed to each other, said permanent magnet generating a magnetic force to operate said locking mechanism, and said plunger coil generating a magnetic field for reducing a magnetic force of said permanent magnet when a predetermined electric current is supplied; and
   a resistor connected in parallel with said plunger coil, resistance of said resistor being substantially equal to resistance of said plunger coil, a resistance of said resistor being selected such that energizing of said coil by said predetermined electric current weakens the magnetic force of said permanent magnet to release said locking mechanism, and such that said resistor reduces undesired self-electromotive electric current induced in said plunger coil to an amount less than said predetermined electric current, preventing said permanent magnet from releasing said locking mechanism.

2. The exposure control device according to claim 1, wherein resistance of said plunger coil is equal to or less than 100Ω and resistance of said resistor is equal to or less than 100Ω.

3. The exposure control device according to claim 2, wherein the resistance of said plunger coil is approximately 15Ω, and the resistance of said resistor is approximately 15Ω.

4. The exposure control device according to claim 1, further comprising:
   an aperture control system which is driven to control an opening size of an aperture; and
   a mechanism which stops said aperture control system, the mechanism comprising an operable ferromagnetic member;
   wherein when said operable ferromagnetic member is attracted by said magnetic plunger, said aperture control system is allowed to vary said opening size of said aperture; and
   wherein when said operable ferromagnetic member is released from said magnetic plunger, said mechanism prevents said aperture control system from changing said opening size.

5. The exposure control device according to claim 1, wherein said undesired self-electromotive electric current is induced in said coil by mechanical shock from within a same device housing said plunger coil.

6. An exposure control device for a camera, comprising:
   an aperture control system, which is driven to vary an opening size of an aperture in relation with a release operation of said camera;
   a detecting system, which detects a driven amount of said aperture control system, and outputs a detection signal when said driven amount has reached a predetermined value;
   a locking mechanism, which locks the operation of said aperture control system;
   a magnetic plunger including a permanent magnet and a plunger coil fixed to each other, said permanent magnet generating a magnetic force to attract said locking mechanism, said plunger coil generating a magnetic field for reducing said magnetic force of said permanent magnet when a predetermined electric current is supplied, said locking mechanism being prevented from locking the operation of said aperture control system when said magnetic plunger attracts said locking mechanism;
   a controller which supplies said predetermined electrical current to said plunger coil in response to said detecting system outputting said detection signal;
   a resistor connected in parallel with said plunger coil, a resistance of said resistor being selected such that energizing of said coil by said predetermined electric current weakens the magnetic force of said permanent magnet to release said locking mechanism, and such that said resistor reduces undesired self-electromotive electric current induced in said plunger coil to an amount less than said predetermined electric current, preventing said permanent magnet from releasing said locking mechanism, resistance of said resistor being substantially equal to a resistance of said plunger coil.

7. The exposure control device according to claim 6, wherein said undesired self-electromotive electric current is induced in said coil by mechanical shock from within said camera.

8. The magnetic plunger according to claim 6, wherein said undesired self-electromotive electric current is induced in said magnetic plunger by mechanical shock from within a device housing said magnetic plunger.

9. A magnetic plunger, comprising:
   a permanent magnet;
   a plunger coil fixed to the permanent magnet, which generates, when energized by a predetermined electric current, a magnetic field which weakens a magnetic force of said permanent magnet;
   a ferromagnetic member that is held by said permanent magnet when said plunger coil is not energized by said predetermined electric current; and
   a resistor, connected in parallel with said plunger coil, a resistance of said resistor being selected such that energizing of said plunger coil by said predetermined electric current weakens the magnetic force of said permanent magnet to release said ferromagnetic member, and such that said resistor reduces undesired self-electromotive electric current induced in said magnetic plunger to an amount less than said predetermined electric current, preventing said permanent magnet from releasing said ferromagnetic member.

10. The magnetic plunger according to claim 9, wherein resistance of said resistor is substantially equal to a DC resistance of said plunger coil.

* * * * *